(12) United States Patent
Taylor

(10) Patent No.: US 10,248,637 B2
(45) Date of Patent: Apr. 2, 2019

(54) HIGH PERCEPTABILITY INK EFFECTS

(71) Applicant: Microsoft Technology Licensing, LLC, Redmond, WA (US)

(72) Inventor: Arianne Marie Taylor, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 116 days.

(21) Appl. No.: 15/290,885

(22) Filed: Oct. 11, 2016

(65) Prior Publication Data
US 2018/0101510 A1    Apr. 12, 2018

(51) Int. Cl.
G06F 17/00    (2006.01)
G06F 17/24    (2006.01)
G06T 11/00    (2006.01)

(52) U.S. Cl.
CPC .......... G06F 17/242 (2013.01); G06T 11/001 (2013.01)

(58) Field of Classification Search
CPC .............................. G06F 17/242; G06T 11/001
See application file for complete search history.

(56) References Cited

U.S. PATENT DOCUMENTS

| | | | |
|---|---|---|---|
| 7,126,590 B2 | 10/2006 | Jelinek et al. | |
| 7,283,683 B1* | 10/2007 | Nakamura | G06T 5/009 382/176 |
| 9,176,473 B1* | 11/2015 | Lieberman | G06K 15/021 |
| 2007/0200002 A1* | 8/2007 | Raksha | B41M 3/148 235/491 |
| 2013/0263027 A1* | 10/2013 | Petschnigg | G06F 3/048 715/761 |
| 2017/0362438 A1* | 12/2017 | Husovska | C09C 1/62 |

OTHER PUBLICATIONS

Shapiro, Scott, "Office Blogs: OneNote July roundup", Published on: Jul. 21, 2016 Available at: https://blogs.office.com/2016/07/21/onenote-july-roundup/.
"itunes Preview: Glitter Doodle HD", Published on: Sep. 14, 2010 Available at: https://itunes.apple.com/us/app/glitter-doodle-hd/id385695782?mt=8.

(Continued)

*Primary Examiner* — Stephen S Hong
*Assistant Examiner* — Marshon L Robinson
(74) *Attorney, Agent, or Firm* — Merchant & Gould P.C.

(57) ABSTRACT

Document authoring that involves illustrating pen input in an authoring environment is herein improved to provide patterns with higher perceptibility for representing the pen input in a graphical user interface. Colors and patterns are provided as effects that are applied to the illustrated pen input so that multiple textures or colors may be applied to the illustrated pen input without requiring the user to manually signal a switch in texture or colors or using multiple objects to represent the pen input. In various aspects, the patterns used in effects are created with a greater perceptibility, so that users will more readily recognize the effect, with various layers of a contrast basis image imparting a perceptible pattern and a background color image imparting colors for an enhanced ink effect definition.

18 Claims, 16 Drawing Sheets

(56) References Cited

OTHER PUBLICATIONS

"iTunes Preview: Scribblify Free—Imaginative Paint, Draw, Sketch and Doodle App for Kids and Adults", Published on: Feb. 1, 2016 Available at: https://itunes.apple.com/us/app/scribblify-free-imaginative/id598393442?mt=8.

"iTunes Preview : Glitterati", Published on: Mar. 27, 2012 Available at: https://itunes.apple.com/us/app/glitterati/id410052281?mt=8.

"iTunes Preview: Spawn Sparkle FREE (Art, Fireworks and Light-Show)", Published on: May 28, 2016 Available at: https://itunes.apple.com/us/app/spawn-sparkle-free-art-fireworks/id406443486?mt=8.

Faulkner, Amy, "iTunes Preview : Sparkle Paint for the iPad", Retrieved on: Aug. 31, 2016 Available at: https://itunes.apple.com/us/app/sparkle-paint-for-the-ipad/id468067682?mt=8.

"Metamoji Note", Retrieved on: Aug. 31, 2016 Available at: http://noteanytime.com/en/.

"Slant: NoteLedge vs Elephant", Retrieved on: Aug. 31, 2016 Available at: https://www.slant.co/versus/2139/2143/~noteledge_vs_elephant.

"5 Reasons to Try Bamboo Paper", Published on: May 11, 2015 Available at: http://bamboo.wacom.com/5-reasons-to-try-bamboo-paper/.

Purcell, Kevin, "GottaBe mobile : How to Master S Note on the Samsung Galaxy Note 4", Published on: Apr. 19, 2015 Available at: https://www.gottabemobile.com/2015/04/19/how-to-master-s-note-on-the-samsung-galaxy-note-4/.

\* cited by examiner

HIGH PERCEPTABILITY INK EFFECTS

BACKGROUND

Ink input, via touchscreen or pointing device, provides users the ability to apply freeform input to an electronic authoring environment. For example, when using the ILLUSTRATOR® graphic design software (available from Adobe Systems Inc. of San Jose, Calif.), the KEYNOTE® presentation application (available from Apple Inc. of Cupertino, Calif.), BAMBOO™ Paper drawing application (available from Wacom Co., Ltd. of Kazo, Japan) or another electronic authoring environment, a user may apply a pen, stylus, or finger via a touchscreen or select a pen input option in a user interface for input via a mouse or other pointing device to provide ink input.

Although users may select various effects for the ink input, affecting the size (e.g., 6 point, 8 pixels, ¼ inch), shape (e.g., squared, rounded, etc.), color, transparency, and texture (e.g., a crayon texture, a paintbrush texture, a calligraphy texture) of the displayed ink object, these effects are basic shape and color effects and users often desire greater ability to highlight content with ink input than is afforded by basic shape and color choices. Additionally, for the user to apply multiple shape and color effects to ink input, the ink input must be broken into multiple objects, with individual effects being applied to each object, thus increasing the workload on the user, and requiring additional system resources to maintain those separate objects in memory. Further, as users desire more elaborate effects applied to their ink input, those effects may become indistinct to the users when using certain sizes of ink inputs; negating the purpose of choosing an elaborate ink effect.

SUMMARY

This summary is provided to introduce a selection of concepts in a simplified form that are further described below in the Detailed Description section. This summary is not intended to identify all features of the claimed subject matter, nor is it intended as limiting the scope of the claimed subject matter.

Systems and methods are provided herein to enable a more efficient interactivity for ink input that enables variable effects to be applied to the ink input as it is illustrated in the graphical user interface of an electronic authoring environment without the need for a user to create multiple objects to which to apply separate effects. An effect definition is selected by a user to apply to a new or existing ink input object in the electronic authoring environment, and the ink input object pulls its effects from the effect definition. In various aspects, the effect definition is anchored to the ink input object, and depending on the size of the ink input object, is tiled or stretched to meet or exceed the size of the ink input object. The ink input object may be anchored at a random position of the effect definition or a defined position in the effect definition (based on other ink input objects, position of the object in the authoring environment, orientation of the object), and the ink input object may include multiple effects in layers. By employing aspects of the present disclosure, an improved user experience is provided and less memory and fewer processing resources are expended to provide advanced effects to ink objects.

Particularly, systems and methods are provided for improving the user-perceptibility of a pattern that has been selected as an ink effect. Two or more images are selected to provide color or contrast to define an ink effect. Various selections of contrasts from a contrast basis image are selected to affect the shades of colors present in a background color image. The contrasts are applied as contrast filters or masks to the background color image so that the patterns present in the contrast basis image are readily apparent to users, but with the colors from the background color image. Additional effects or filters are applied to ensure that for a given geometry, the user will see the details from the pattern generated from the contrast basis image and the background color image.

The details of one or more aspects are set forth in the accompanying drawings and description below. Other features and advantages will be apparent from a reading of the following detailed description and a review of the associated drawings. It is to be understood that the following detailed description is explanatory only and is not restrictive; the proper scope of the present disclosure is set by the claims.

BRIEF DESCRIPTION OF THE DRAWINGS

The accompanying drawings, which are incorporated in and constitute a part of this disclosure, illustrate various aspects of the present disclosure. In the drawings.

DETAILED DESCRIPTION

Figure 1:
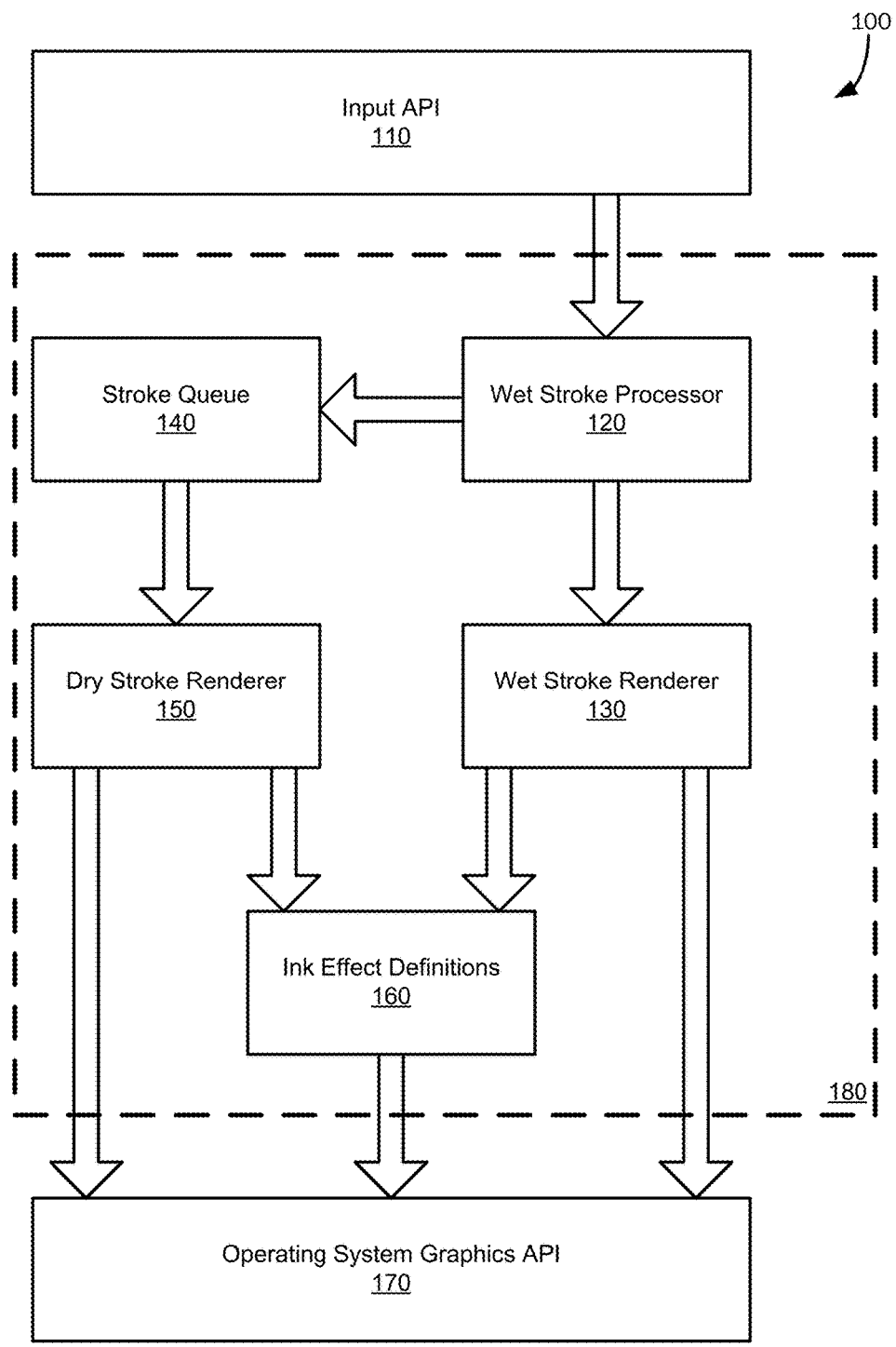
FIG. 1 illustrates a block diagram of a system enabled to accept ink inputs and apply advanced effects to the ink objects in an electronic authoring environment.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. Examples may take the form of a hardware implementation, or an entirely software implementation, or an implementation combining software and hardware aspects. The following detailed description is, therefore, not to be taken in a limiting sense.

Systems and methods are provided herein to enable a more efficient interactivity for ink input that enables variable graphical effects to be applied to the ink input as it is illustrated in the graphical user interface of an electronic authoring environment without the need for a user to create multiple objects to which to apply separate effects. An effect definition is selected by a user to apply to a new or existing ink input object in the electronic authoring environment, and the ink input object pulls its effects from the effect definition. In various aspects, the effect definition is anchored to the ink input object, and depending on the size of the ink input object, is tiled or stretched to meet or exceed the size of the ink input object. The ink input object may be anchored at a random position of the effect definition or a defined position in the effect definition (based on other ink input objects, position of the object in the authoring environment, orientation of the object), and the ink input object may include multiple effects in layers. By employing aspects of the present disclosure, an improved user experience is provided and less memory and fewer processing resources are expended to provide advanced effects to ink objects.

Particularly, systems and methods are provided for improving the user-perceptibility of a pattern that has been selected as an ink effect. Particularly, systems and methods are provided for improving the user-perceptibility of a pattern that has been selected as an ink effect. Two or more images are selected to provide color or contrast to define an ink effect. Various selections of contrasts from a contrast basis image are selected to affect the shades of colors present in a background color image. The contrasts are applied as contrast filters or masks to the background color image so that the patterns present in the contrast basis image are readily apparent to users, but with the colors from the background color image. Additional effects or filters are applied to ensure that for a given geometry, the user will see the details from the pattern generated from the contrast basis image and the background color image.

FIG. 1 illustrates a block diagram of a system 100 enabled to accept ink inputs and apply advanced effects to the ink objects in an electronic authoring environment, represented by dashed line 180. Examples of an electronic authoring environment 180 include, but are not limited to: word processing programs, presentation programs, illustration programs, note taking programs, spreadsheet programs, etc. The electronic authoring environment 180 processes the inputs received from the input application program interface (API) 110 (i.e., pointer inputs), and passes them for rendering to the operating system graphics API 170, which in turn will pass the graphics of the electronic authoring environment 180 (including ink objects) to an output device, such as, for example, a computer monitor or smartphone display.

The system 100 may receive pointer inputs from input devices such as mice, keyboards, remote controls, and the like, or from natural user input (NUI) methods including those relying on speech recognition, touch and stylus recognition, gesture recognition both on screen and adjacent to the screen, air gestures, head and eye tracking, voice and speech, vision, touch, hover, gestures, and machine intelligence. Pointer inputs are those inputs that define a user's point of interaction within a graphical user interface, such as by a cursor represented within a given program or application and associated with a given input device. Inputs may be interpreted by the input API 110 for use in the electronic authoring environment 180 as digital ink input. A user may signal to the system 100 that ink input is desired, as opposed to other styles of input, by selecting an ink input user interface (UI) element, using a particular input device, or contextually based on a position of a pointer in the electronic authoring environment 180. For example, a user may use an ink input stylus on a touch screen to indicate that inking input is desired (as opposed to positional input via a mouse device), inking input may be enabled in a canvas area of an electronic authoring environment 180 (as opposed to selection input in UI control areas of the electronic authoring environment 180), or inking input may be enabled when a user actuates a mouse button (as opposed to positional input when the mouse button is unactuated). When the user has indicated that ink input is desired, the input API 110 receives the inputs from the input devices, and transmits coordinates and pressures (if available on a touch-based device) and other metadata to the electronic authoring environment 180. The other metadata may include, but is not limited to: a device identifier (e.g., stylus one, stylus two), primary or secondary input (e.g., mouse button one or two, stylus nib or "eraser"), velocity of input, authoring mode of when input is received (e.g., editing mode, presentation mode, textbox input, freeform input), user-defined settings within the electronic authoring environment 180, etc.

Input from the input API 110 is received by the wet stroke processor 120, which groups together the inputs into strokes. Inputs are collected until it is determined that a stroke is complete, such as, for example, a user lifts a stylus from a touch screen or touch input falls below a pressure threshold, releases a mouse button, a pointer remains motionless for a set period of time, etc. Strokes are passed from the wet stroke processor 120 to the stroke queue 140 for incorporation into a document and to the wet stroke renderer 130 for rendering and display to a user. As will be appreciated, while a stroke is in its "wet" state, it may be incomplete (i.e., the user may still be making that stroke), and it is passed from the wet stroke processor 120 to the wet stroke renderer 130 as it is being input so that the user receives feedback as to what the stroke looks like in the GUI while the user makes the stroke.

The wet stroke renderer 130 creates a geometry for the stroke in the "wet" state based on the coordinates (and, optionally, pressures and other metadata) in the authoring area of the graphical user interface (GUI) of the stroke as it has been received as well as the drawing parameters of the electronic authoring environment 180. As will be appreciated, the drawing parameters of the electronic authoring environment 180 may specify a shape and size of the geometry to be associated with the stroke. For example, a user may select a circle, square, slash, star, etc., as a shape (or stamp) for the stroke and a size designated of that shape (e.g., 2 pt, 6 pt, 0.25 cm, 1/16 inch, 25 pixels). The drawing parameters may also indicate an ink effect to apply to the stroke or options for the ink effect. The wet stroke processor 120 uses these inputs to create the geometry of the stroke as it will be seen in the GUI. These geometries are passed to the operating system graphics API 170 and may include an ink effect definition 160, when an ink effect has been selected by a user, so that the user can see the ink effect applied to the stroke while the user makes that stroke in the GUI, for example, seeing the "ink" flowing from a stylus into the GUI.

The stroke queue 140 receives completed strokes from the wet stroke processor 120 and integrates them into the document that the electronic authoring environment 180 is editing. In various aspects, the coordinates and metadata (e.g., pressures, drawing parameters) of the input are stored within the document's framework, for example, as an object in an extensible markup language (XML) hierarchy or a JavaScript Object Notation (JSON) representation. The stroke queue 140 may retrieve objects from the document framework for display in the GUI as "dry" strokes when the file is reopened or a user navigates to a portion of the document in which the object resides, making that object visible or partly visible in the GUI as the user navigates the GUI. The user may modify the "dry" strokes via the GUI to change reference points, a scale of the strokes, or the drawing parameters.

The dry stroke renderer 150 creates a geometry for the stroke in the "dry" state based on the coordinates (and, optionally, pressures and other metadata) in the authoring area of the graphical user interface (GUI) of the stroke as it has retrieved from the document framework as well as the drawing parameters for the stroke. As will be appreciated, the drawing parameters of a dry stroke may differ than those set in the electronic authoring environment 180 for new strokes, and the user may change the drawing parameters of the dry stroke via various dialogs and controls in the GUI. These geometries are passed to the operating system graphics API 170 and may include an ink effect definition 160, when an ink effect has been selected by a user, so that the user can see the ink effect applied to the strokes that have been committed to the electronic authoring environment 180.

The ink effect definitions 160 define additional graphical effects that are applied to the geometries of the strokes shown in the GUI. These effects may be shown in various layers, and various behaviors that are set by the user, and discussed in relation to FIGS. 2-11. The definitions include image files (e.g., bitmap, GIF (graphics interchange format), JPEG (joint photographic experts group), PNG (portable network graphic)) as well as spectral lines (defining various colors to use in series with a stroke). In some aspects, animated images, such as animated GIFs, may be used as the image files for ink effect definitions 160 so that an animated effect, such as, for example, a flash, sparkle, wave, fade, pulse, etc., may be applied to the ink object.

When an image file is used as an ink effect definition 160, the strokes may specify anchoring properties (indicating a position and orientation) to the ink effect definition 160 or may use a random anchor point from which a mask may be applied. Similarly, when a spectral line is used as an ink effect definition 160, the starting color may be specified by an anchor or the starting color may be randomly assigned and the orientation of the spectral line relative to the geometry may be defined by the user or randomly assigned. Anchors may be assigned by a user to remain constant per stroke (e.g., to use the same anchor for each new stroke), to be based on the previous stroke (e.g., to use the prior stroke's endpoint as a new stroke's anchor point), to be based on the position or orientation of the stroke in the canvas, or to be randomly selected for each new stroke.

Ink effect definitions 160 may be stretched or tiled to meet or exceed the size of the ink objects in the electronic authoring environment 180. For example, if a user has selected a spectral line of a rainbow pattern to apply as the user writes in the GUI, the rainbow may cycle from red to purple and back to red several times as the user inputs strokes. In another example, if a user has selected an image file, the image file may be stretched to match or exceed the size of an individual stroke or a collection of strokes, or the image file may be tiled to match or exceed the size of an individual stroke or a collection of strokes. As will be appreciated, a two-dimensional image file may be tiled in two dimensions (vertically and horizontally), and may be rotated or un-rotated when it is tiled to provide mirror symmetry or repeat the image.

As will also be appreciated, when an image is chosen for an ink effect, the details of that image may be lost depending on the size and orientation of the geometry for rendering a stroke unless the pattern's perceptibility is improved. As used herein, an imperceptible image is a background or pattern that is applied as an ink effect, but with a level of detail or spacing between design elements in that image that is too great to display to the user based on the area of the stroke geometry to which it is applied. For example, in a constellation pattern, showing individual stars against the blackness of space, the pattern is an imperceptible image when applied to narrow strokes; the spacing of the stars in the background image may be such that the stars are not displayed to the user, making the pattern appear as black with an occasional white speck of a star. In another example, the constellation pattern is not an imperceptible image when used with a thicker stroke geometry, so that the pattern of the stars is apparent to the user when applied to the geometries of the strokes. In a further example, a tartan pattern is an imperceptible image when applied to a small-area stroke geometry, such that the pattern appears as individual stripes rather than as a plaid. Other examples of potentially imperceptible images that may be chosen for a high perceptibility ink effect include, but are not limited to: a metallic sheen, a glittery effect, an animal print (e.g., leopard spots, zebra stripes, tiger stripes, giraffe blotches, Dalmatian spots, leather), a star/galaxy/constellation pattern, polka dots, plaids or tartans, paisleys, floral patterns, cloud patterns, forestry patterns, and other patterns that may not be apparent when viewed when applied to stroke geometries.

To enable users to select and see the patterns present in images, even when using small geometries for strokes, the electronic authoring environment 180 is operable to enhance the perceptibility of those patterns. In various aspect, the electronic authoring environment 180 selects one or more of a spectrum and an image, creates one or more filters that enhance the contrast of the image, and applies the filters to the spectrum and the image.

In various aspects users may use ink effect definitions 160 included in the local deployment of the electronic authoring environment 180, receive ink effect definitions 160 via a cloud-based element of the electronic authoring environment 180, or define their own ink effect definitions (e.g., specify an image file, specify colors to use in a spectral line). When a definition is provided, it may be specified whether (and how) the image is to be tiled or stretched when applied to ink objects.

The operating system graphics API 170 handles the geometries and rendered graphical effects so that they will be displayed according to the display devices associated with the system 100. The geometries and ink effect definitions 160 are converted to pixel values appropriate for the user's display device and any overlay effects are provided. For example, for a given geometry and ink effect definition, the operating system graphics API 170 may render the ink object according to a first way (having x pixels with various hues and luminosities) when the ink object is displayed on a first display device but render the ink object according to a second way (having y pixels with various hues and luminosities) on a second display device, such as, for example, when a user views a presentation on a laptop monitor and switches display to a projector with a different resolution and color properties.

Figure 2:
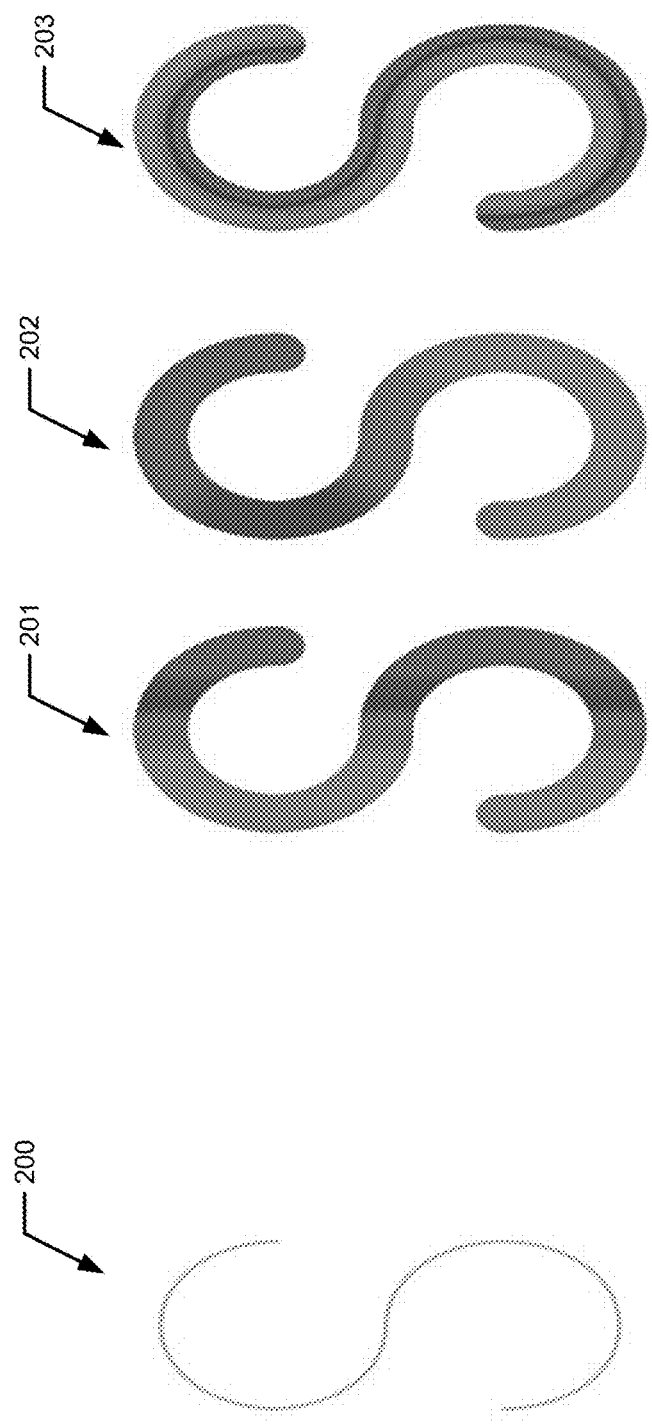
FIG. 2 illustrates several examples of advanced ink effects being applied to an ink input by applying an ink effect definition of a spectral line.

FIG. 2 illustrates several examples of graphical effects of advanced ink effects being applied to an ink input by applying an ink effect definition of a spectral line as a mesh to the geometry of the stroke. Illustrated on the left, the ink input 200 for the letter "S" is shown, which may have been input into the electronic authoring environment 180 in a single stroke. A first example 201 illustrates a gradient ink effect defined by a spectral line that is applied horizontally across the ink input 200, a second example 202 shows a gradient ink effect applied along the path of the stroke for the ink input 200, and a third example 203 shows a gradient ink effect applied across the stroke for the ink input 200. Other applications are possible, such as, for example, a bloom from the center of the stroke which would expand as the stroke lengthens, and the preceding are given as non-limiting examples.

Figure 3:
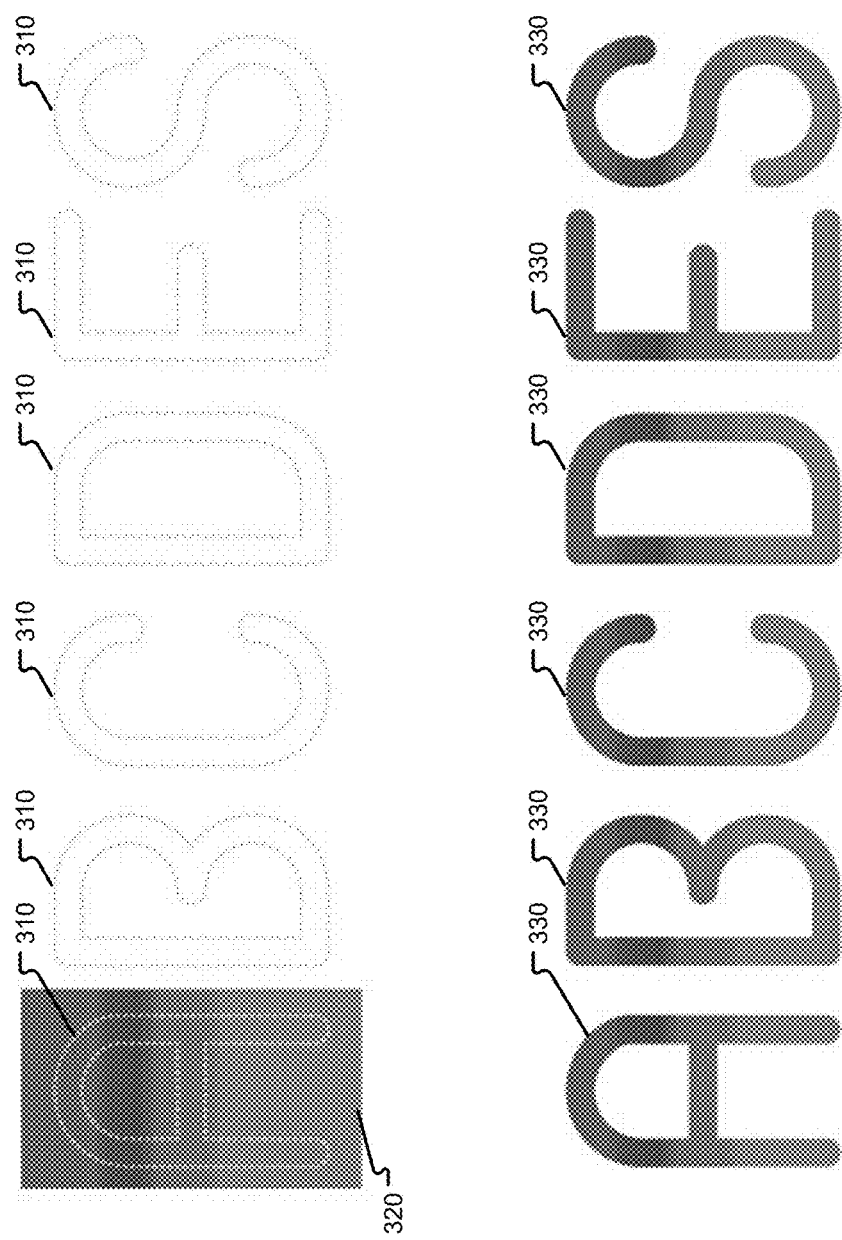
FIG. 3 illustrates an example of graphical effects of advanced ink effects being applied to strokes by applying an ink effect definition of an image file.

FIG. 3 illustrates an example of graphical effects of advanced ink effects being applied to strokes by applying an ink effect definition of an image file. The geometries 310 for strokes are illustrated via dashed lines, which are applied to an image definition 320 to create an effect mask 330 for each stroke. By creating an effect mask 330 rather than pushing a spectral line along a stroke, greater effect consistency across strokes and ink objects may be achieved. As shown, each of the geometries 310 have the same vertical (grayscale) rainbow effect, regardless of where a stroke began, crossed other strokes, or ended.

Figure 4:
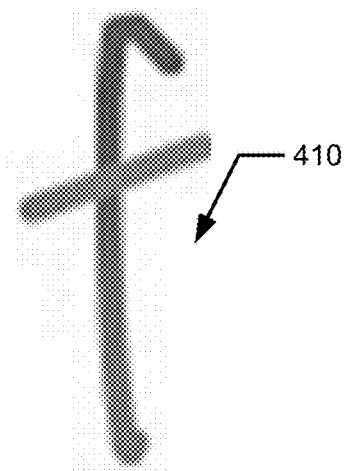
FIG. 4 illustrates two examples of anchoring the same text strokes differently to the same spectral line.
Figure 4:
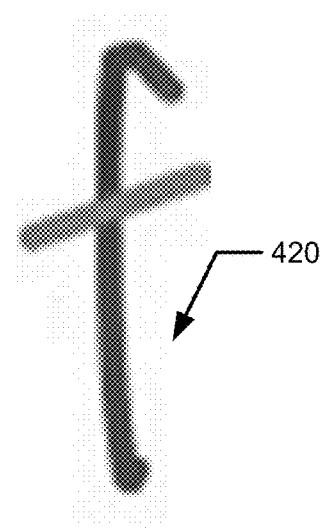

FIG. 4 illustrates two examples of anchoring the same text strokes differently to the same spectral line. As illustrated in both examples, the letter "f" has been written in using a spectral line of a cyclic rainbow (i.e., ranging from a first color to a second color to a third color with appropriate interstitial colors and repeating) with the ascender written with one stroke (from top to bottom) and the crossbar with a second stroke (from left to right). In the first example 410, the anchor point in the spectral line for each stroke is based on the last used color of the previous stroke, such that the crossbar for the letter "f" continues the coloration used last for the ascender of the letter "f" (shown as the first color). In the second example 420, however, a random anchor point or offset anchor point (e.g., a defined skip in colors) is used so that the end color from the last stroke is not used as the start color of the next stroke as shown by the ascender of the letter "f" ending in the second color, but the crossbar starting with the first color. As will be appreciated, if each stroke uses the same anchor (which is an option in some aspects, although not illustrated), the start color for the ascender stroke would be the same as the start color for the crossbar stroke in the example of writing the letter "f".

Figure 5:
FIG. 5 illustrates two examples of applying an image map with different anchors.

FIG. 5 illustrates two examples of applying an image map with different anchors. In both of the examples the same nine strokes have been provided, inputting the cursive of "Write the Rainbow."

The first example 510 has been anchored to the image definition of a rainbow according to the position of the stroke on a canvas, such that the highest portions of the "W" stroke is shown in first color, but the highest portions of the strokes for "the", which lie below the "W" stroke's highest portions on the canvas, are shown in a second color other than the first color. As will be appreciated, if the stroke positions are anchored individually to the image definition, the high points (medial points or low points, in various aspects) of each stroke would be the same color (assuming no stretching or shrinking) regardless of their relative positions on a canvas. Alternatively, the advanced ink effect may have been applied to the ink object of the collected strokes instead of the individual strokes, in which case the anchoring may have been achieved via anchoring the object to the image definition without regard to canvas position of the individual strokes.

The second example 520 has been anchored to the image definition perpendicular to the anchoring shown in the first example 510 such that the rainbow effect does not change color vertically, but horizontally across the ink object. As will be appreciated, the image definition for the rainbow has been applied across the ink object, rather than individually across each stroke, although in various examples, each stroke may be individually anchored, such that, for example, the "W" stroke would cycle through the (grayscale) rainbow from left to right, as would the "rite" stroke, the dot stroke, the crossbar stroke, etc. As will also be appreciated, if the image definition were not large enough to be mapped to the ink object, it may be stretched to the size of the ink object or tiled to meet the size of the ink object, and if the image file were tiled for the second example 520, the (grayscale) rainbow may repeat at various points in the cursive of "Write the Rainbow."

Figure 6:
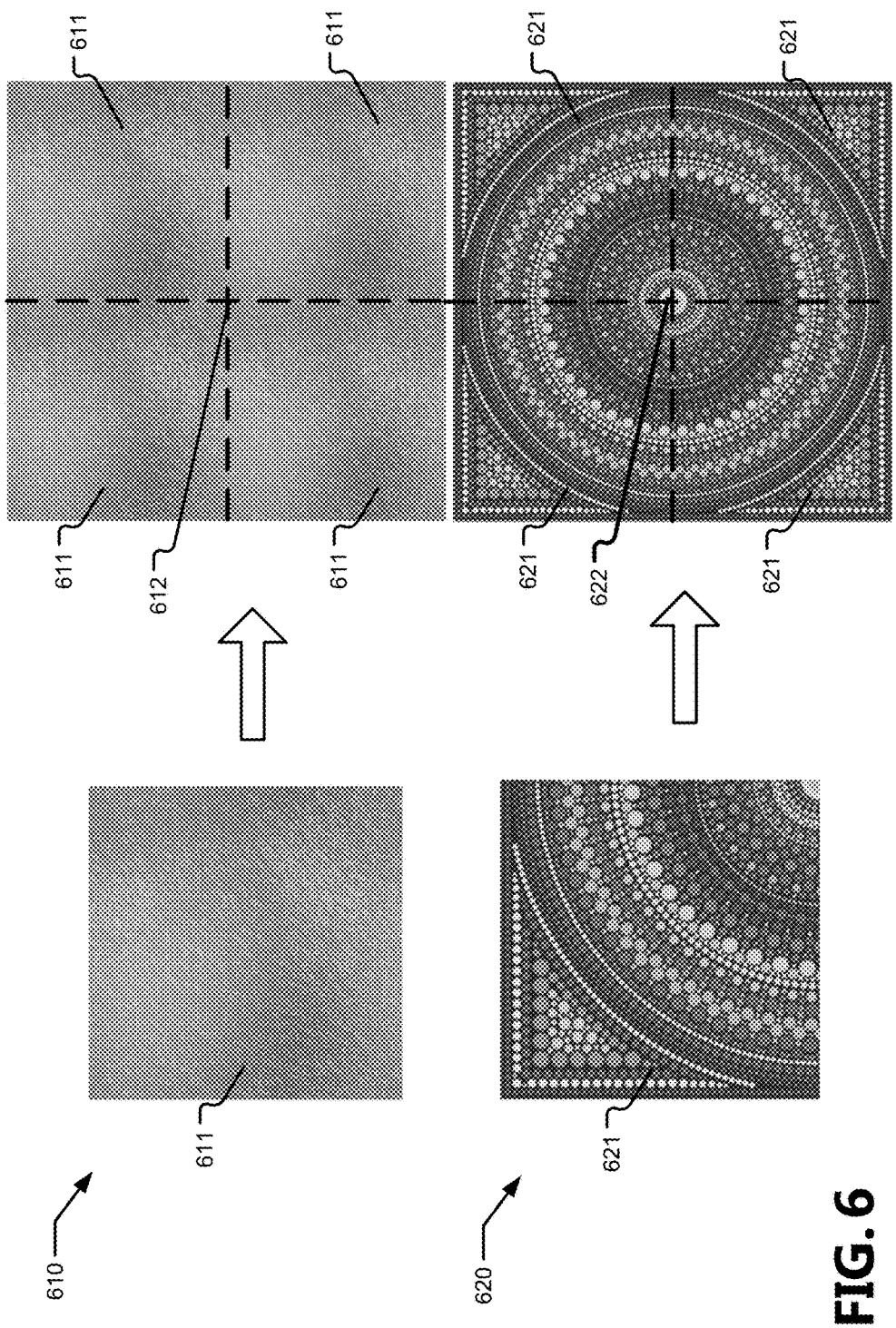
FIG. 6 illustrates two examples for tiling an image definition.

FIG. 6 illustrates two examples for tiling an image definition. In a first example tiling 610, an initial image 611 is repeated as necessary in the X and Y directions while maintaining the orientation of that initial image 611 in each tile of the tiled image 612. In a second example 620, an initial image 621 is repeated as necessary in the X and Y direction, while rotating the orientation of that initial image 621 in some or all of the tiles of the tiled image 622. As will be appreciated, a given image may be rotated across an X axis, Y axis, or both axes, and two rotations about a given axis (or axes) will result in the initial orientation. Depending on the image used for the image definition, various tiling methods or stretching of the image may be preferred, which may be indicated to the electronic authoring environment 180 via metadata associated with those images, or user preferences. In some aspects, an irregular image definition is rendered tileable by applying an offset filter to the image definition, applying a morph filter to one edge of the image definition based on an opposite edge (e.g., left to right, top to bottom), smoothing the edges of the image definition, and/or applying a solid matte border to the image definition so that a repeated tile of each image mates to the adjacent tilings in one or more directions.

Figure 7A:
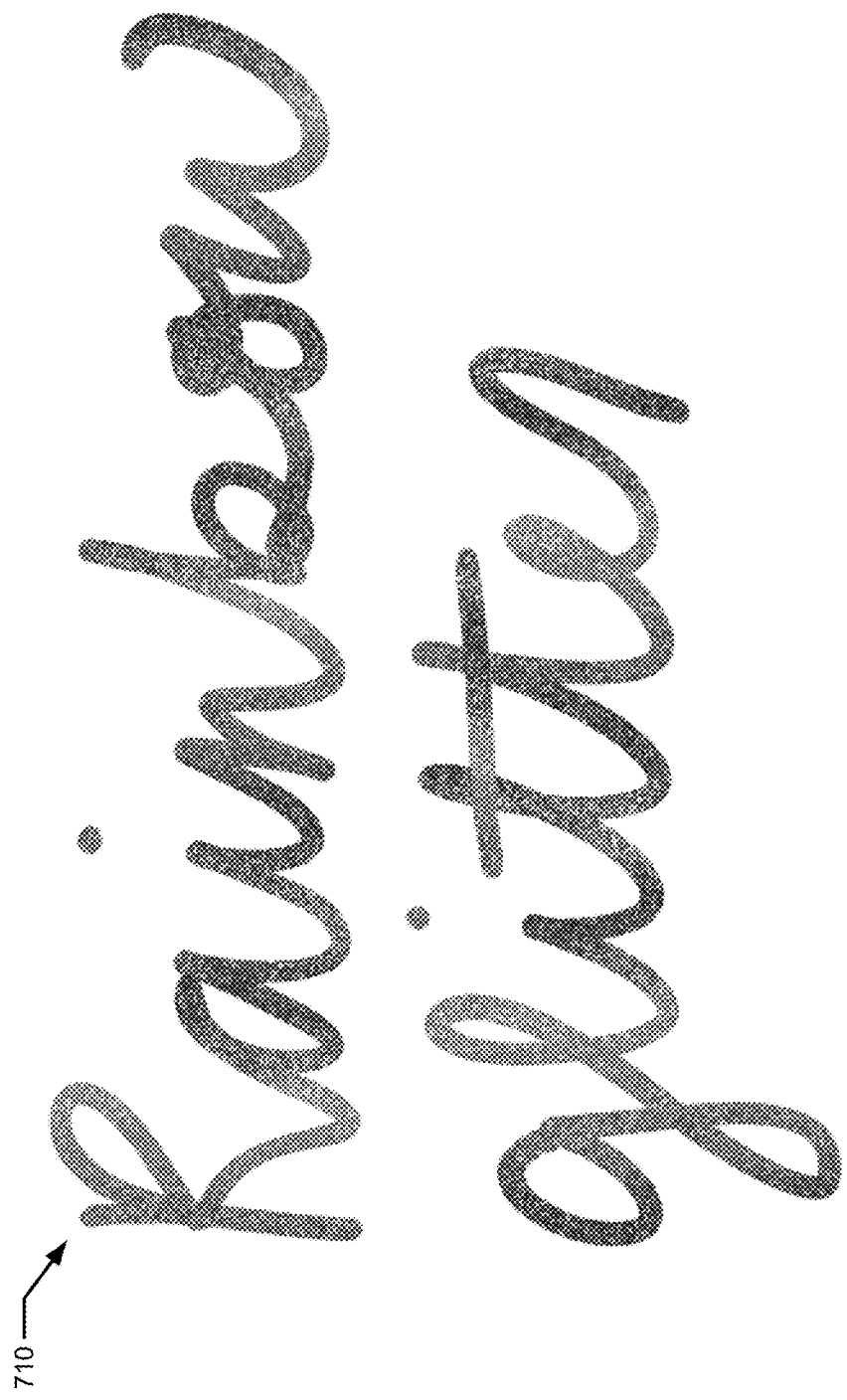
FIGS. 7A and 7B illustrate layered graphical effects applied as ink effects with improved perceptibility.

FIG. 7A illustrates an example 710 layered graphical effect for rainbow glitter applied as an ink effect with improved perceptibility. When layering ink effects, multiple calls from stroke renderers 130 or 150 may be made for a single set of strokes to apply multiple effects, or a single effect with multiple features may be called. As will be appreciated, the resulting geometries may be treated as one object or as separate objects in the electronic authoring environment 180 in different aspects. In the illustrated example 710, the text of "Rainbow Glitter" has been input in five strokes, and an ink effect for multi-colored (grayscale) glitter has been applied to the geometries. The multi-colored gradient is applied according to a selected spectrum (e.g., a rainbow; red-yellow-black; green-blue-pink; purple-gray, black-gray-white), and repeats seamlessly as the effect is applied to stroke geometries. The glitter texture, which in some aspects is based on an imperceptible image, is applied to the stroke geometries with the selected spectrum via one or more filters and effects to enhance the perceptibility of the pattern, as is discussed in greater detail in regard to FIG. 8.

Figure 7B:
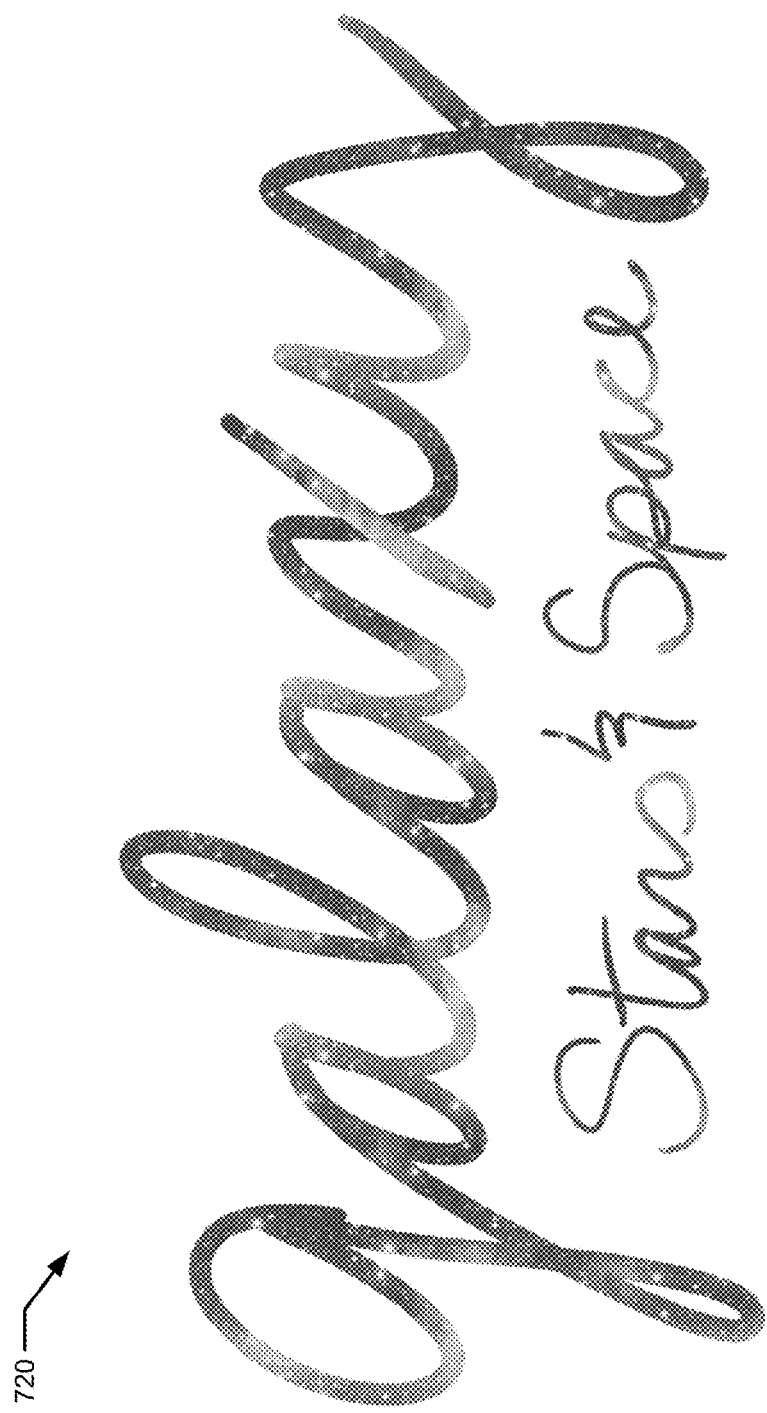

FIG. 7B illustrates an example 720 layered graphical effect for galaxy starscape pattern applied as an ink effect with improved perceptibility. In the illustrated example 720, the text of "galaxy Stars & Space" has been input in seven strokes, and an ink effect for a multi-colored (grayscale) starscape has been applied to the geometries. The multi-colored gradient is applied according to a selected spectrum (e.g., a rainbow; red-yellow-black; green-blue-pink; purple-gray, black-gray-white), and repeats seamlessly as the effect is applied to stroke geometries. The galaxy starscape pattern, which in some aspects is based on an imperceptible image, is applied to the stroke geometries with the selected spectrum via one or more filters and effects to enhance the perceptibility of the pattern, as is discussed in greater detail in regard to FIG. 9.

Figure 8:
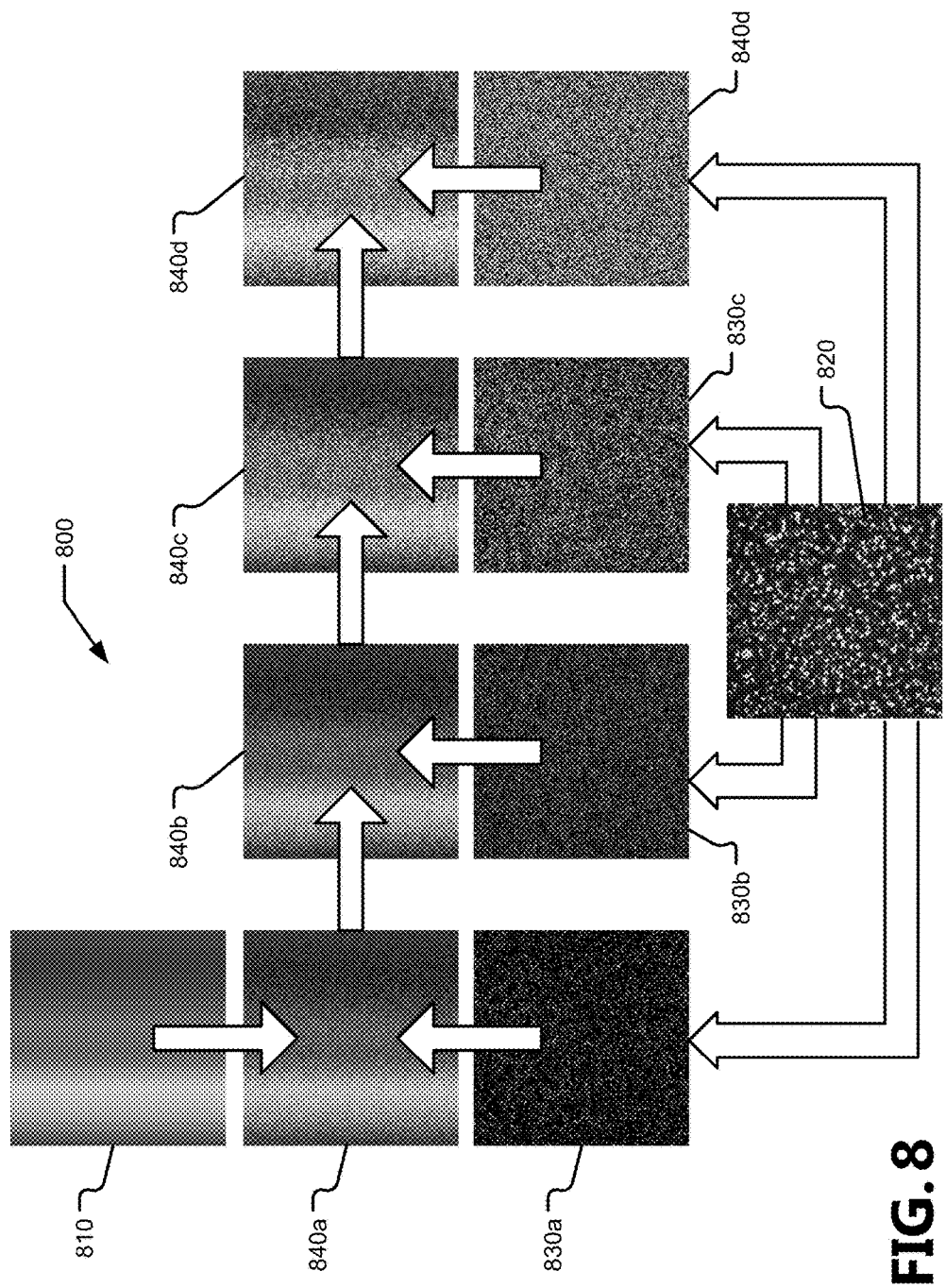
FIG. 8 illustrates an example of building a "rainbow glitter" effect for application with stroke geometries as an enhanced perceptibility pattern.

FIG. 8 illustrates an example 800 of building a "rainbow glitter" effect for application with stroke geometries as an enhanced perceptibility pattern. In various aspects, a background color image 810 is selected to apply with a contrast basis image 820 for the desired ink effect, either as a pre-defined gradient or as a series of colors and an order thereof by a user. As will be appreciated, a background color image 810 comprises one or more colors, which may include grayscale colors. As illustrated in example 800, the background color image 810 is a seven-color rainbow (shown in grayscale) and the contrast basis image 820 is an image of a glitter pattern to be applied as a texture over the colored background. In various aspects, the contrast basis image 820 may include color values that will affect the color of the enhanced ink effect, while in other aspects, the color values of the contrast basis image 820 will not be imparted as colors in the enhanced ink effect. For example, if the contrast basis image 820 were a color image of purple glitter, the purple color may either affect the color channels of the ink effect texture (shifting the background color image 810 to be more purple) or affect the luminance, but not the chrominance of the background color image 810.

To apply the contrast basis image 820 to the background color image 810 and produce an enhanced pattern 840 with greater perceptibility, one or more contrast filters 830*a-d* (generally, contrast filter 830) are generated based on the contrast basis image 820 and are applied as layers to the background color image 810 to produce a corresponding number of enhanced patterns 840*a-d*. Each of the contrast filters 830 extract a texture from the texture image provided by the contrast basis image 820, which may be saved as a corresponding number of channels representing sub-textures of the contrast basis image 820. In various aspects, the contrast filters 830 are applied serially to the background color image 810 so that a first contrast filter 830*a* is applied to the background color image 810 to produce a first enhanced pattern 840*a*, a second contrast filter 830*b* is applied to the first enhanced pattern 840*a* to produce a second enhanced texture 840*b*, etc. Stated differently, each of the channels representing sub-textures of the texture image is layered over the background image's colors to produce a final ink effect definition. Although FIG. 8 illustrates four contrast filters 830 and four enhanced patterns 840, it will be appreciated that more or fewer contrast filters 830 may be used in different aspects to produce correspondingly more or fewer enhanced patterns 840.

Each of the contrast filters 830 is based on various properties of the contrast basis image 820, such as, for example, to produce a mask of the high-tones, a mask of the low-tones, and various masks of mid-tones in the contrast basis image 820. Different weights may be applied to the contrast basis image 820 to define contrasts or absolute color channel values that specify high-, mid-, or low-tones (e.g., regions of at least chrominance/luminance X are considered tone type A, regions having chrominance/luminance difference from an adjacent regions of at least Y are considered tone type B). Similarly, each contrast filter 830 may be applied with different weights to the background color image 810 with higher or lower transparency/alpha values to have a lesser or greater effect on the background color image 810 to produce a corresponding enhanced pattern 840.

Figure 9:
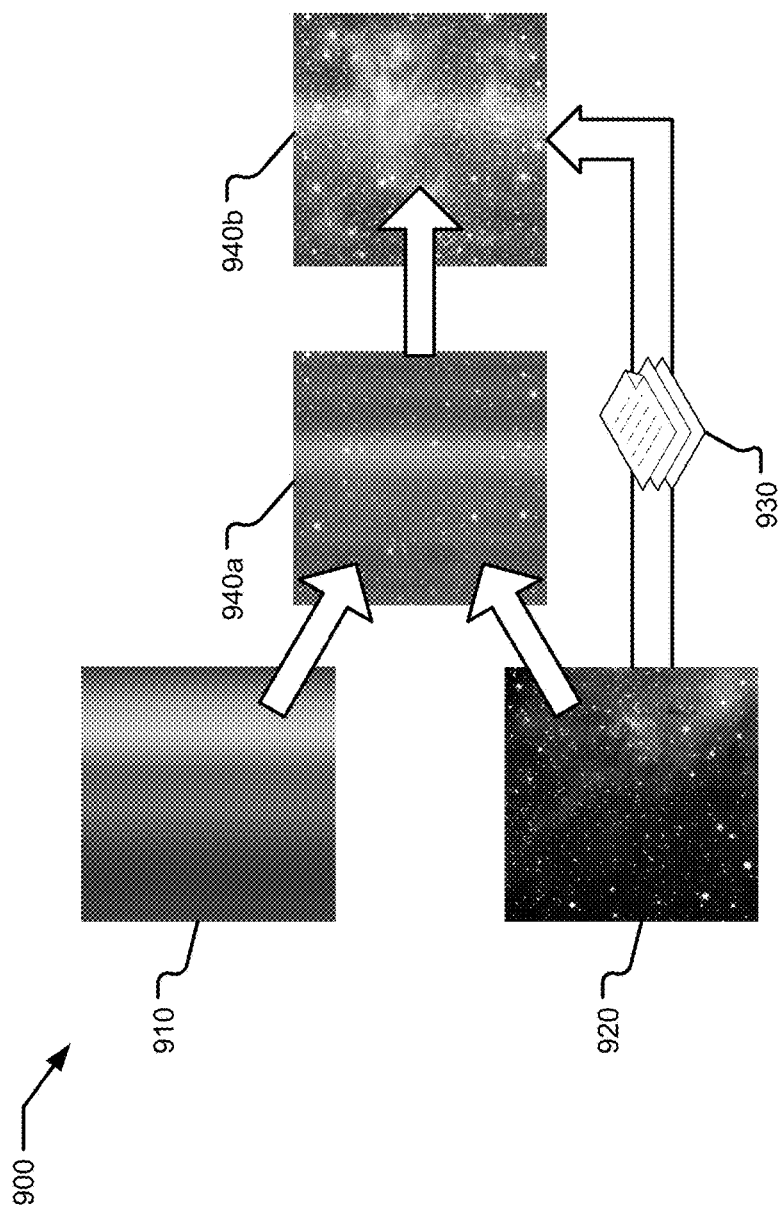
FIG. 9 illustrates an example of building a "galaxy" effect for application with stroke geometries as an enhanced perceptibility pattern.

FIG. 9 illustrates an example 900 of building a "galaxy" effect for application with stroke geometries as an enhanced perceptibility pattern. In some aspects, the size of the contrast basis image 920 or the distance between features in the contrast basis image 920 may be such that a first enhanced pattern 940*a* is not perceptible to the user when applied to stroke geometries of a given length or width, and additional effects 930 are therefore applied to the first enhanced pattern 940*a* to produce a second enhanced pattern 940*b*. For example, when a geometry having a defined area (for a set width over a length) can have a portion of the first enhanced pattern 940*a* applied such that a contrast change falls below a given threshold or does not include a region having high contrast to an adjacent region, it may be determined to add additional effects 930.

In the illustrated example 900, even with the background color image 910 applying different colors to the contrast basis image 920 of a starscape, regions of the contrast basis image 920 lack nebulae or stars and the corresponding regions of the first enhanced pattern 940*a* are therefore lower in contrast than the regions with nebulae or stars. If the electronic authoring environment 180 determines that the first enhanced pattern 940*a* can be applied to a defined-size geometry (from any anchor point and direction therefrom) without a change in contrast meeting a threshold value or a defined number of changes that meet the threshold, additional effects 930 will be applied to the first enhanced pattern 940*a* to produce a second enhanced pattern 940*b*. In various aspects, the additional effects 930 include, but are not limited to: cloud filters, blur filters, white noise filters, a filter of an offset (vertical and/or horizontal) of the contrast basis image 920, a filter of a second contrast basis image 920, etc. Additional effects 930 may be selected by a user, presented to a user to select from or automatically selected and applied by the electronic authoring environment 180 when a selected geometry size would result in insufficient change in contrast.

Figure 10:
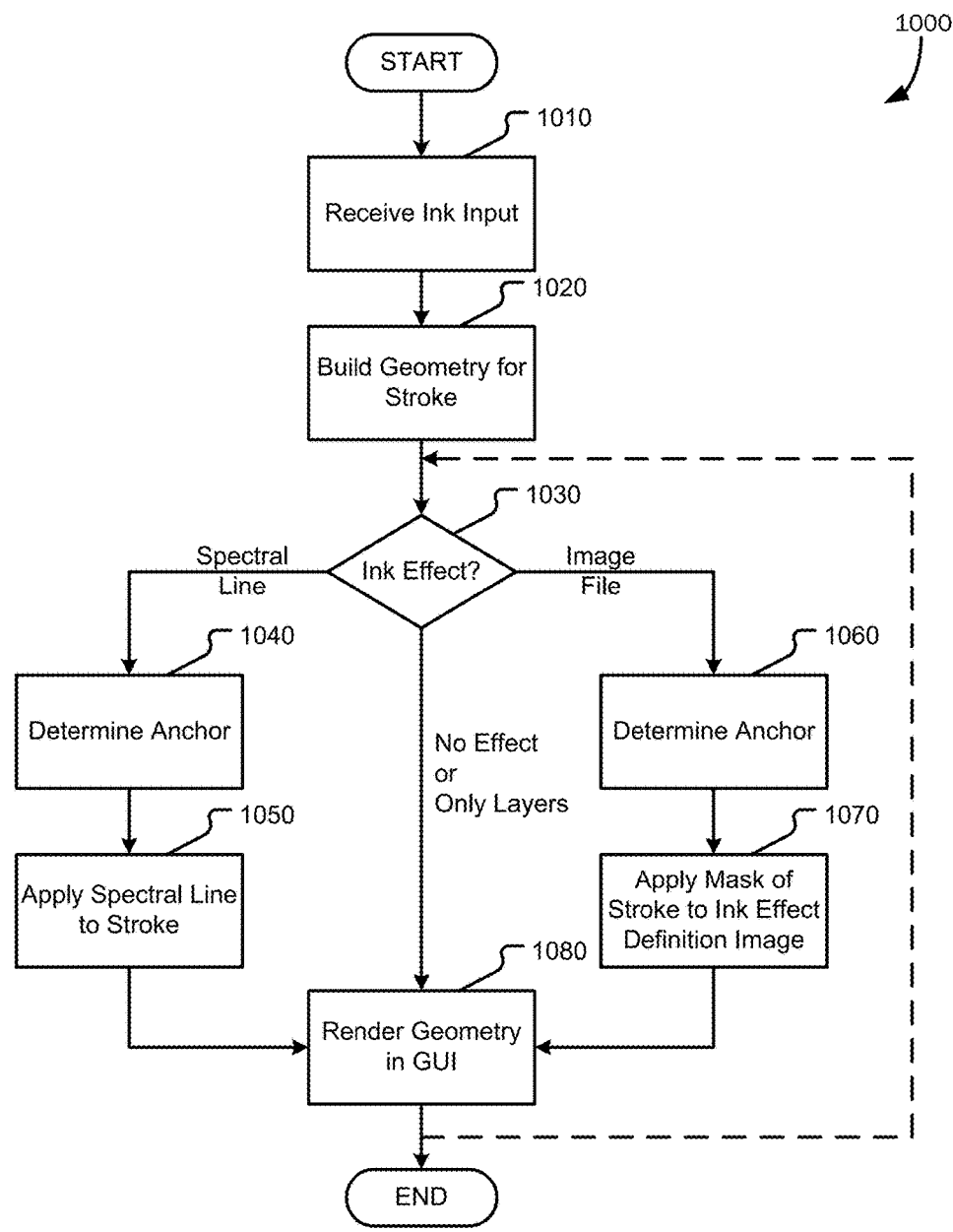
FIG. 10 is a flowchart showing general stages involved in an example method for providing advanced ink effects.

FIG. 10 is a flowchart showing general stages involved in an example method 1000 for providing graphical effects as advanced ink effects. Method 1000 begins at OPERATION 1010, where ink inputs are received in a GUI (via user interaction in the GUI for a "wet" stroke) or retrieved from a document store (e.g., stored ink objects or "dry" strokes). The ink inputs contain coordinate data for where in the GUI or canvas they were received or belong, and may optionally include metadata related to pressure on a touchpad for the received inputs (if appropriate), velocity at which the input is received (e.g., whether a user is quickly or slowly changing locations at which input is received), the device which made the input, etc. Additionally, drawing parameters set within the electronic authoring environment 180 are received in OPERATION 1010, such as, for example, whether the user has selected an ink effect, a size of the geometry to be based around the inputs (e.g., a pt size, a pixel size, a unit size), a shape or stamp for building the geometry (e.g., a circle, a square, a star, a hexagon, a rhombus), a color, a transparency, etc. When an ink effect has been selected, a user may select multiple different drawing parameters, which may be layered and included in a layered ink effect definition 160, an image file for use as an ink effect definition 160, and/or a spectral line for use as an ink effect definition 160 and the associated parameters with those ink effects (e.g., anchor points, tiling/stretching, orientations in which to apply the effects, order of layers).

At OPERATION 1020 the geometry to represent the ink input is built based on the drawing parameters of the ink input. The geometry enables the stroke to be represented as a two dimensional object in the electronic authoring environment 180. Method 1000 then proceeds to DECISION 1030 where it is determined whether an ink effect is to be applied when rendering the geometry in the GUI.

When it is determined at DECISION 1030 that the user has selected an ink effect of a spectral line, method 1000 proceeds to OPERATION 1040, where an anchor in the ink effect definition 160 is determined. Anchors enable a desired starting position in the spectral line, and may specify a given color of the colors comprising the spectral line to be used first when applying the spectral line to the geometry, which may be a preferred color (e.g., always start with the first color in the spectral line), a random color, or a color based on the last used color from a previous stroke (e.g., if the last color applied to the last stroke inputted is color A, use color B). When a user breaks an ink object into multiple ink objects, the new ink objects may retain anchors so that they retain their original ink effects, or new anchors may be assigned to at least one of the new ink objects so that new ink effects are applied to the at least one new ink objects.

At OPERATION 1050 the spectral line is applied from the anchor color of the spectral line to the geometry of the stroke. Depending on the length of the stroke, the length of a draw distance drawing parameter, whether the color series of the spectral line is variable-length-enabled for individual colors or each color is afforded the same relative length when applied, the orientation of application (e.g., horizontally, along the path of the stroke, across the stroke), and the length of the stroke, the spectral line will be applied differently to the geometry of the stroke. Example applications of a spectral line to stroke geometry are discussed in relation to FIGS. 2-5. The spectral line defines the colors that are applied as a mesh (e.g., a triangular mesh) or as a raster map to the geometry of a stroke. Method 1000 then proceeds to OPERATION 1080, where the geometry with the applied mesh (or raster map) is rendered in the GUI.

When it is determined at DECISION 1030 that the user has selected an ink effect of an image file, method 1000 proceeds to OPERATION 1060, where an anchor in the ink effect definition 160 is determined. Anchors enable a desired starting position in the image file and orientation by which the image is to be applied to the geometry (e.g., horizontally, vertically, X degrees from horizontal or vertical). Anchors may specify that a stroke or a collection of strokes may be placed relative to the coordinates of the image file so that the masks applied to the geometry include specific portions of the image file. The anchor may be based on the previous stroke's anchor value (first or last location and/or orientation of the stroke), a canvas position of the stroke, or a preferred position and orientation in the image. When a user breaks an ink object into multiple ink objects, the new ink objects may retain anchors so that they retain their original ink effects, or new anchors may be assigned to at least one of the new ink objects so that new ink effects are applied to the at least one new ink objects.

At OPERATION 1070 the image file is applied from the anchor position in the image file to the geometry of the stroke. Depending on the relative sizes of the geometry of a stroke or a group of strokes compared to the size of the image definition, the image definition may be tiled or stretched (or shrunk) to account for the size of the geometry. The geometry is applied to the image to create an ink effect mask. The geometry is placed on the image defined by the user to use as an ink effect definition 160 (or stretched/tiled version thereof) according to the anchor point and the pixels of the image definition that intersect the geometry are transmitted to be rendered in the GUI so that the inking effect desired by the user matches the size and shape of geometry for the stroke. Examples of using an ink effect mask to apply an image file to stroke geometry are discussed in relation to FIGS. 6-9. Method 1000 then proceeds to OPERATION 1080 where the ink effect mask is rendered in the GUI.

When it is determined at DECISION 1030 that the user has not selected an ink effect or the ink effect selected only calls for layers of geometries that do not invoke spectral lines or image files to apply to the geometries (e.g., geometries to be rendered with solid colors), method 1000 proceeds to OPERATION 1080, where the geometries for the strokes are rendered in the GUI. In various aspects, the multiple geometries may be treated as separate objects in the electronic authoring environment 180 or as a single object.

Method 1000 may repeat OPERATIONS 1030-1080 multiple times, once for each layer of the ink effect, which may include geometries that have no advanced ink effects or other graphical effects applied thereto as well as geometries that have had an advanced ink effect (e.g., a spectral line or an image file) applied thereto. Method 1000 then concludes.

Figure 11:
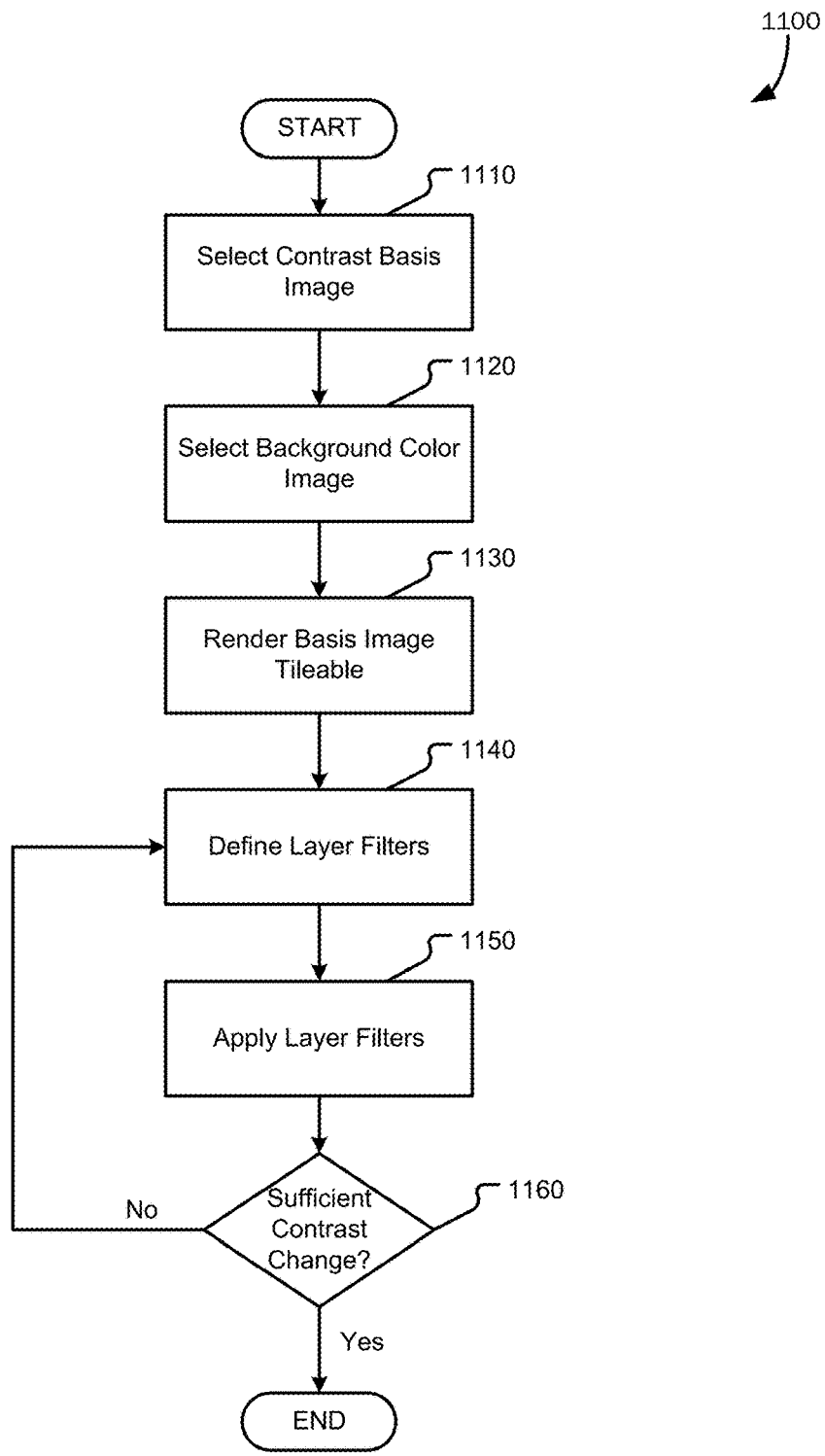
FIG. 11 is a flowchart showing general stages involved in an example method for providing an ink effect with improved user-perceptibility.

FIG. 11 is a flowchart showing general stages involved in an example method 1100 for providing an ink effect with improved user-perceptibility. In various aspects, the improved-perceptibility ink effect definition is used in method 1000 in response to a selection at DECISION 1030 to use an ink effect. In some aspects, method 1100 begins at OPERATION 1110, where a contrast basis image is selected for the enhanced ink effect definition, and proceeds to OPERATION 1120, where a background color image is selected. In other aspects, method 1100 begins at OPERATION 1120, where a background color image is selected, and proceeds to OPERATION 1110, where a contrast basis image is selected for the enhanced ink effect definition.

The contrast basis image defines contrast values to be applied with color values defined in the background color image in the enhanced ink effect definition. In various aspects, the background color or the contrast basis images are user-defined at the time of application to the stroke geometries, while in other aspects the background color and/or contrast basis images are pre-defined as an ink effect definition for use in the electronic authoring environment 180. In various aspects, the background color is a solid color or a gradient (defined by the system or selected by the user) that is matched in size to the contrast basis image by tiling or stretching the background color image to the same size as the contrast basis image.

At OPERATION 1130 the contrast basis image is rendered seamlessly tileable to enable the image to repeat smoothly as it is applied to the stroke geometries from various anchor points in the basis image. For example, the basis image may tile or tile and rotate, as illustrated in FIG. 6. In some aspects, an offset filter is used to smooth transitions between tiles of the basis image and render it seamlessly tileable, such as, for example, copying a portion of a first edge to a transverse edge of the basis image and applying a smoothing technique at the join. For example, a left edge of an image may have a portion of a right edge copied and appended thereto, and the line at which the portion of the right edge is joined to the left edge may have a blur filter applied thereto so that a user cannot tell where one tile of the image begins. In other aspects, a morph filter is applied to opposite edges of the contrast basis image or a matte border is applied around the contrast basis image to render the contrast basis image seamlessly tileable. As will be appreciated, the basis image may be rendered tileable along one or more axes, and the above described techniques may be applied to one or more edges (top, bottom, left, right) to produce a seam-free image that is freely tileable in multiple axes.

Proceeding to OPERATION 1140, one or more layer filters are defined. In various aspects, the number of layer filters is defined by a user, and a user may request more or fewer layer filters to apply the ink effect as part of selecting an ink effect to apply to the stroke geometries. In one aspects, the layer filters are based on the contrast basis image, to highlight aspects of the contrast basis image in the enhanced pattern. In another aspect, additional layer filters are based on a second contrast basis image or a procedural filter (e.g., a cloud filter, smear filter, white noise filter, or other filter defining modifications to color/contrast values based on mathematical models of surrounding color/contrast values), to add additional contrast and detail to the contrast basis image. Each layer filter based on a contrast basis image isolates a portion of the contrast values from the contrast basis image to highlight a given contrast level according to a layer filter definition. For example, the portions of the contrast basis image that are lightest or darkest (e.g., having the highest/lowest luminance) as defined in the definition may be isolated to highlight a bright/dark portion of the image. In another example, the portions of the contrast basis image that have a greatest chrominance for a given channel or channels (e.g., red [#FF0000] and Light Salmon [#FFA07A], rather than dark red [#8B0000] or Salmon [#FA8072]—due to having a greater red channel value) are isolated to highlight those portions of the contrast basis image. In yet another example, individual pixels are selected that have an average (mean) luminance difference from the pixels surrounding them that meets a selection parameter for a layer filter definition. Layer filters based on procedural filters include additional effects, such as noise, blurring, clouds, etc., that are used to reduce "empty space" in a pattern of a contrast basis image, where the pattern would otherwise be featureless or monochromatic.

At OPERATION 1150 the layer filters are applied to the background color image by merging each filter as a layer to the background color image to produce the ink effect definition with improved perceptibility. In various aspects, each layer filter provides various transparency (also referred to as alpha) values, chrominance values, and luminance values based on the contrast values of the contrast basis image to affect a shade of a color value that shows through from the background color image. For example, a color of #777777 (corresponding to a medium gray) from the background color image may have a layer filter applied to increase or decrease its color values in all or a portion of its color channels (e.g., increasing the red color channel to yield #AA7777, decrease all color channels to yield #333333).

In various aspects, one or more filters are applied as masks to the background color image that increase/decrease the values of one or more color channels based on the base color of the background color image at a corresponding location. For example, a contrast value from a layer filter at point (X,Y) raises or lowers the contrast in one or more color channels of the background color at point *(X,Y) by n % or n, up to or down to a value cap (set between #00 and #FF in a 32-bit color spectrum). In another aspect, a filter sets a color value at a specific value for one or more channels at a position in the background color image.

Proceeding to DECISION 1160, it is determined whether the enhanced ink effect pattern has sufficient contrast changes in a given area to be perceptible to the user. In some aspects, the DECISION 1160 is made in response to a user resizing a dry stroke, or applying a new ink effect to a dry stroke, and the given area is defined by at least a portion of the dry stroke (e.g., a given length for a dry stroke). In other aspects, the DECISION 1160 is made in response to the user creating the ink effect or selecting the ink effect to apply with a wet stroke, and the given area is defined by a pre-defined length and width for a stroke geometry or a pre-defined length and a user selected width (e.g., a brush size or line thickness of an ink input) for a stroke geometry, respectively.

In various aspects, one or more selections of the ink effect definition equivalent in size to the given area are examined from one or more anchor positions in the ink effect (in one or more directions) to ensure that sufficient contrast exists in the ink effect definition from multiple potential anchors. For example, to determine whether sufficient contrast differences exist in the ink effect definition for the given area, the overall contrast change in the given area is calculated and compared to a contrast threshold. In another example, various regions in the given area are defined and their average contrast values are compared to adjacent regions in the given area to compare to a contrast threshold. In response to the contrast threshold being satisfied, it is determined that there is sufficient contrast in the given area. In various aspects, the regions are defined in an n×n grid of evenly sized parts of each portion. In response to the contrast threshold not being satisfied (at least once), it is determined that there is insufficient contrast in the given area, and the perceptibility of the ink effect definition will need further enhancement.

In various aspects, a minimum size of the given area may be set so that DECISION 1160 is not run for small strokes falling below a minimum geometry size threshold. For example, the "dots" on the letter 'i' or 'j', punctuation marks, etc., may have the ink effect pattern applied according to method 1100 and will satisfy DECISION 1160 regardless of the actual contrast present in the stroke geometries that fall below the minimum size. When an ink effect definition is applied to a geometry that does not exceed the geometry size threshold it is determined that the ink effect definition is perceptible.

In response to determining that there is insufficient contrast change, method 1100 returns to OPERATION 1140 to define additional layer filters to increase the perceptibility of the pattern of the selected ink effect. In response to determining that there is sufficient contrast change, method 1100 may conclude.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 12:
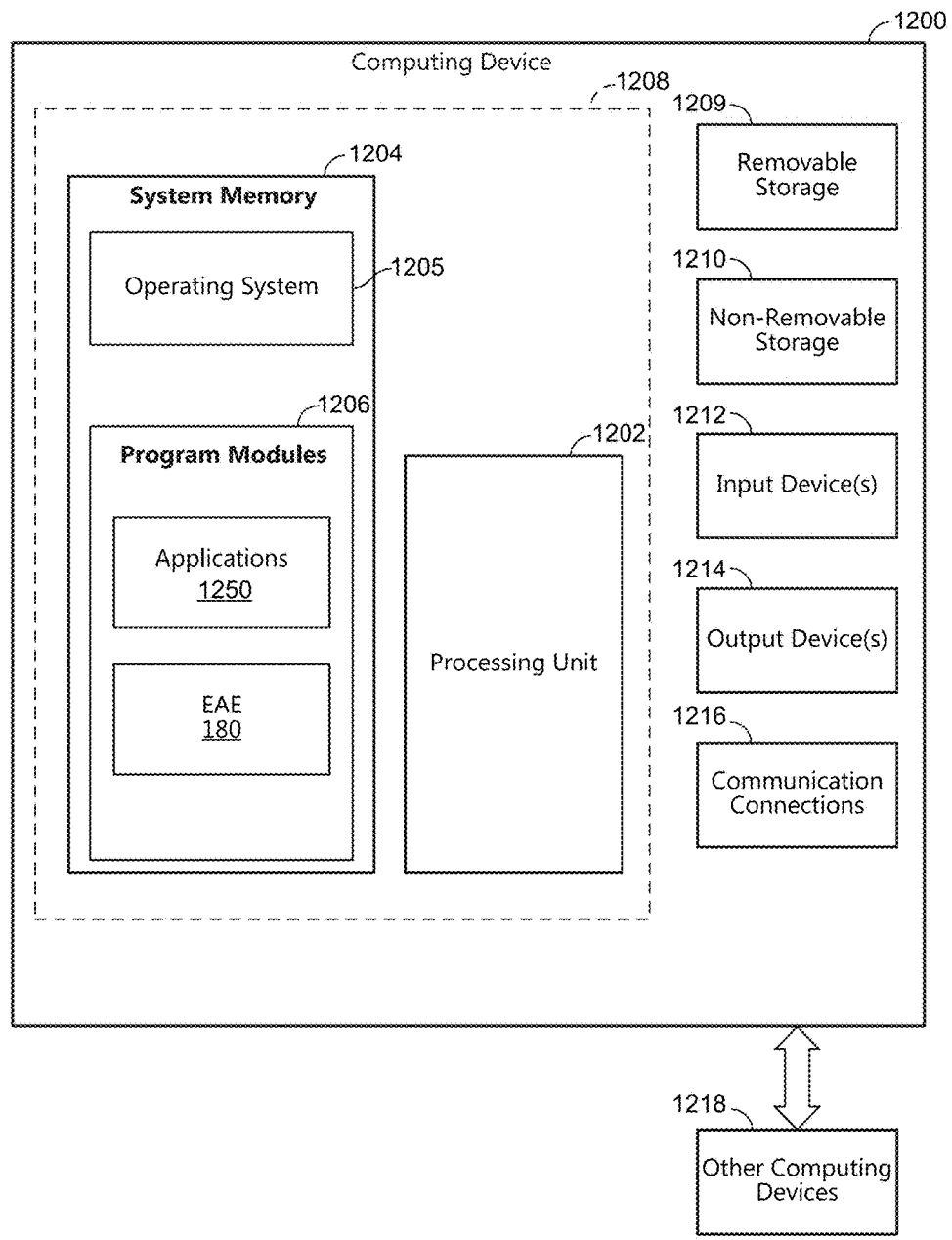
FIG. 12 is a block diagram illustrating physical components of a computing device with which examples may be practiced.
Figure 13A:
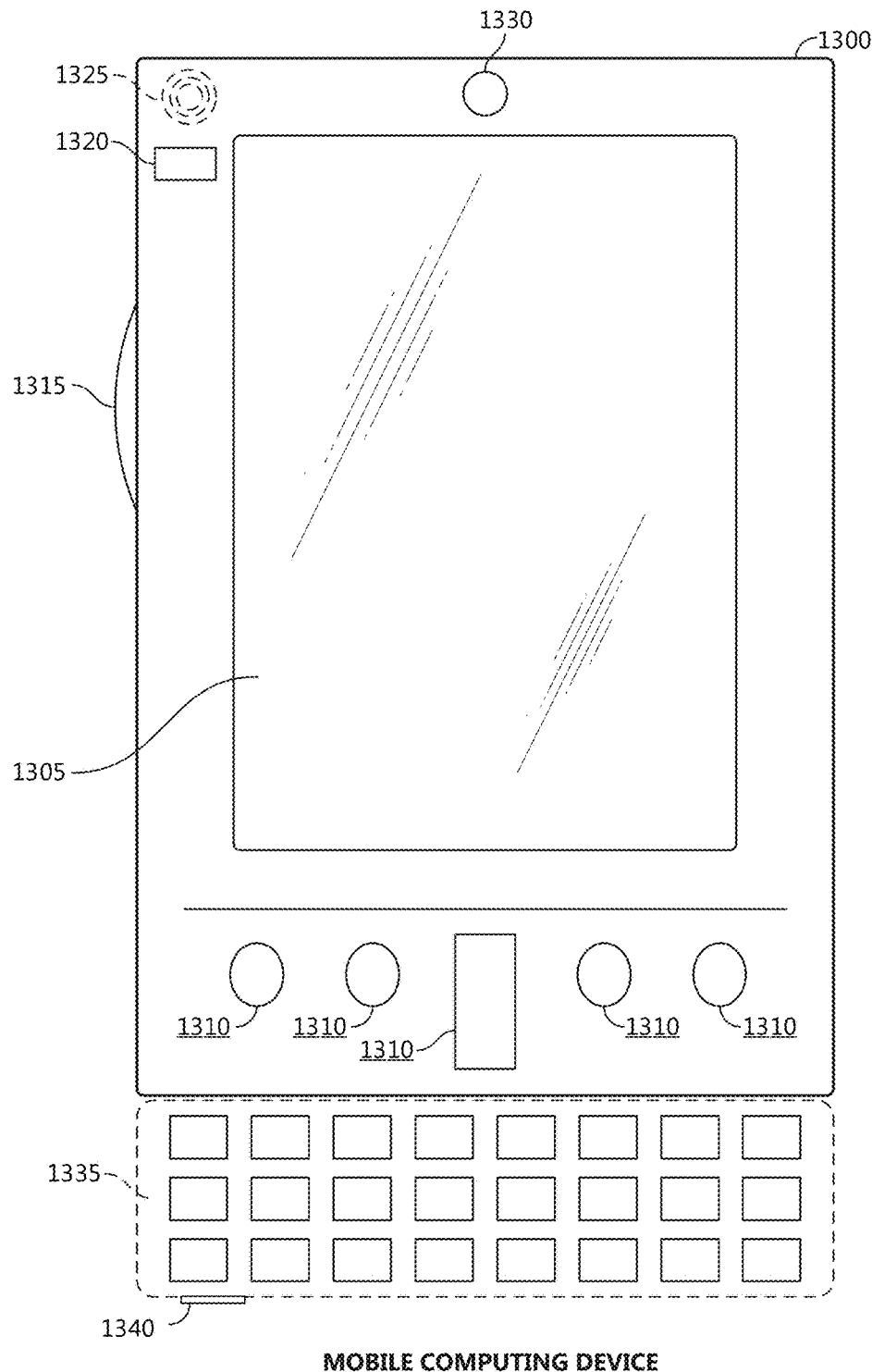
FIGS. 13A and 13B are block diagrams of a mobile computing device with which aspects may be practiced.
Figure 13B:
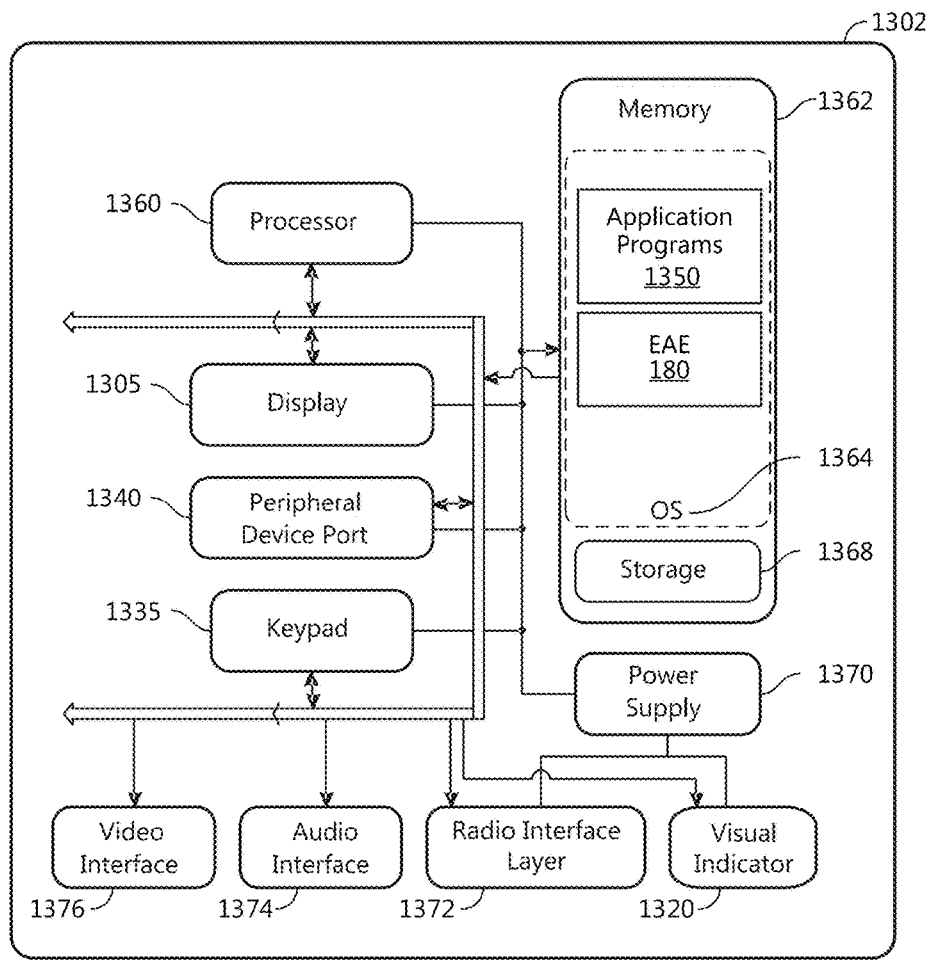
Figure 14:
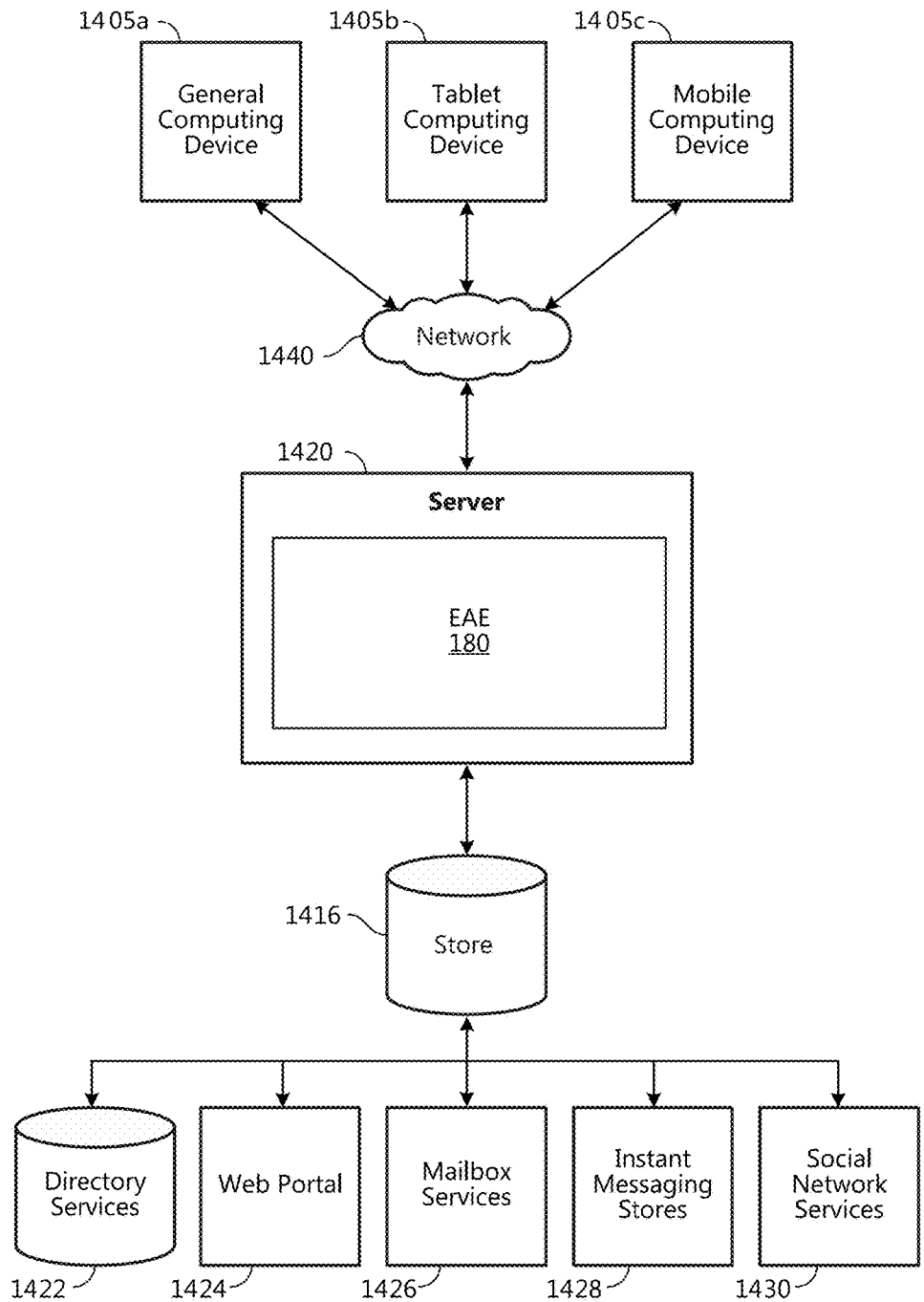
FIG. 14 is a block diagram of a distributed computing system in which aspects may be practiced.

FIGS. 12-14 and the associated descriptions provide a discussion of a variety of operating environments in which examples are practiced. However, the devices and systems illustrated and discussed with respect to FIGS. 12-14 are for purposes of example and illustration and are not limiting of a vast number of computing device configurations that are utilized for practicing aspects, described herein.

FIG. 12 is a block diagram illustrating physical components (i.e., hardware) of a computing device 1200 with which examples of the present disclosure may be practiced. In a basic configuration, the computing device 1200 includes at least one processing unit 1202 and a system memory 1204. According to an aspect, depending on the configuration and type of computing device, the system memory 1204 comprises, but is not limited to, volatile storage (e.g., random access memory), non-volatile storage (e.g., read-only memory), flash memory, or any combination of such memories. According to an aspect, the system memory 1204 includes an operating system 1205 and one or more program modules 1206 suitable for running software applications 1250. According to an aspect, the system memory 1204 includes an electronic authoring environment 180, operable to enable a software application 1250 to employ the teachings of the present disclosure via stored instructions. The operating system 1205, for example, is suitable for controlling the operation of the computing device 1200. Furthermore, aspects are practiced in conjunction with a graphics library, other operating systems, or any other application program, and is not limited to any particular application or system. This basic configuration is illustrated in FIG. 12 by those components within a dashed line 1208. According to an aspect, the computing device 1200 has additional features or functionality. For example, according to an aspect, the computing device 1200 includes additional data storage devices (removable and/or non-removable) such as, for example, magnetic disks, optical disks, or tape. Such additional storage is illustrated in FIG. 12 by a removable storage device 1209 and a non-removable storage device 1210.

As stated above, according to an aspect, a number of program modules and data files are stored in the system memory 1204. While executing on the processing unit 1202, the program modules 1206 (e.g., an electronic authoring environment 180) perform processes including, but not limited to, one or more of the stages of the methods 1000 and 1100 illustrated in FIGS. 10 and 11, respectively. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 1200 has one or more input device(s) 1212 such as a keyboard, a mouse, a pen, a sound input device, a touch input device, etc. The output device(s) 1214 such as a display, speakers, a printer, etc. are also included according to an aspect. The aforementioned devices are examples and others may be used. According to an aspect, the computing device 1200 includes one or more communication connections 1216 allowing communications with other computing devices 1218. Examples of suitable communication connections 1216 include, but are not limited to, radio frequency (RF) transmitter, receiver, and/or transceiver circuitry; universal serial bus (USB), parallel, and/or serial ports.

The term computer readable media, as used herein, includes computer storage media apparatuses and articles of manufacture. Computer storage media include volatile and nonvolatile, removable and non-removable media implemented in any method or technology for storage of information, such as computer readable instructions, data structures, or program modules. The system memory 1204, the removable storage device 1209, and the non-removable storage device 1210 are all computer storage media examples (i.e., memory storage). According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1200. According to an aspect, any such computer storage media is part of the computing device 1200. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 13A and 13B illustrate a mobile computing device 1300, for example, a mobile telephone, a smart phone, a tablet personal computer, a laptop computer, and the like, with which aspects may be practiced. With reference to FIG. 13A, an example of a mobile computing device 1300 for implementing the aspects is illustrated. In a basic configuration, the mobile computing device 1300 is a handheld computer having both input elements and output elements.

The mobile computing device 1300 typically includes a display 1305 and one or more input buttons 1310 that allow the user to enter information into the mobile computing device 1300. According to an aspect, the display 1305 of the mobile computing device 1300 functions as an input device (e.g., a touch screen display). If included, an optional side input element 1315 allows further user input. According to an aspect, the side input element 1315 is a rotary switch, a button, or any other type of manual input element. In alternative examples, mobile computing device 1300 incorporates more or fewer input elements. For example, the display 1305 may not be a touch screen in some examples. In alternative examples, the mobile computing device 1300 is a portable phone system, such as a cellular phone. According to an aspect, the mobile computing device 1300 includes an optional keypad 1335. According to an aspect, the optional keypad 1335 is a physical keypad. According to another aspect, the optional keypad 1335 is a "soft" keypad generated on the touch screen display. In various aspects, the output elements include the display 1305 for showing a graphical user interface (GUI), a visual indicator 1320 (e.g., a light emitting diode), and/or an audio transducer 1325 (e.g., a speaker). In some examples, the mobile computing device 1300 incorporates a vibration transducer for providing the user with tactile feedback. In yet another example, the mobile computing device 1300 incorporates a peripheral device port 1340, such as an audio input (e.g., a microphone jack), an audio output (e.g., a headphone jack), and a video output (e.g., a HDMI port) for sending signals to or receiving signals from an external device.

FIG. 13B is a block diagram illustrating the architecture of one example of a mobile computing device. That is, the mobile computing device 1300 incorporates a system (i.e., an architecture) 1302 to implement some examples. In one example, the system 1302 is implemented as a "smart phone" capable of running one or more applications (e.g., browser, e-mail, calendaring, contact managers, messaging clients, games, and media clients/players). In some examples, the system 1302 is integrated as a computing device, such as an integrated personal digital assistant (PDA) and wireless phone.

According to an aspect, one or more application programs 1350 are loaded into the memory 1362 and run on or in association with the operating system 1364. Examples of the application programs include phone dialer programs, e-mail programs, personal information management (PIM) programs, word processing programs, spreadsheet programs, Internet browser programs, messaging programs, and so forth. According to an aspect, an electronic authoring environment 180 is loaded into memory 1362. The system 1302 also includes a non-volatile storage area 1368 within the memory 1362. The non-volatile storage area 1368 is used to store persistent information that should not be lost if the system 1302 is powered down. The application programs 1350 may use and store information in the non-volatile storage area 1368, such as e-mail or other messages used by an e-mail application, and the like. A synchronization application (not shown) also resides on the system 1302 and is programmed to interact with a corresponding synchronization application resident on a host computer to keep the information stored in the non-volatile storage area 1368 synchronized with corresponding information stored at the host computer. As should be appreciated, other applications may be loaded into the memory 1362 and run on the mobile computing device 1300.

According to an aspect, the system 1302 has a power supply 1370, which is implemented as one or more batteries. According to an aspect, the power supply 1370 further includes an external power source, such as an AC adapter or a powered docking cradle that supplements or recharges the batteries.

According to an aspect, the system 1302 includes a radio 1372 that performs the function of transmitting and receiving radio frequency communications. The radio 1372 facilitates wireless connectivity between the system 1302 and the "outside world," via a communications carrier or service provider. Transmissions to and from the radio 1372 are conducted under control of the operating system 1364. In other words, communications received by the radio 1372 may be disseminated to the application programs 1350 via the operating system 1364, and vice versa.

According to an aspect, the visual indicator 1320 is used to provide visual notifications and/or an audio interface 1374 is used for producing audible notifications via the audio transducer 1325. In the illustrated example, the visual indicator 1320 is a light emitting diode (LED) and the audio transducer 1325 is a speaker. These devices may be directly coupled to the power supply 1370 so that when activated, they remain on for a duration dictated by the notification mechanism even though the processor 1360 and other components might shut down for conserving battery power. The LED may be programmed to remain on indefinitely until the user takes action to indicate the powered-on status of the device. The audio interface 1374 is used to provide audible signals to and receive audible signals from the user. For example, in addition to being coupled to the audio transducer 1325, the audio interface 1374 may also be coupled to a microphone to receive audible input, such as to facilitate a telephone conversation. According to an aspect, the system 1302 further includes a video interface 1376 that enables an operation of an on-board camera 1330 to record still images, video stream, and the like.

According to an aspect, a mobile computing device 1300 implementing the system 1302 has additional features or functionality. For example, the mobile computing device 1300 includes additional data storage devices (removable and/or non-removable) such as, magnetic disks, optical disks, or tape. Such additional storage is illustrated in FIG. 13B by the non-volatile storage area 1368.

According to an aspect, data/information generated or captured by the mobile computing device 1300 and stored via the system 1302 are stored locally on the mobile computing device 1300, as described above. According to another aspect, the data are stored on any number of storage media that are accessible by the device via the radio 1372 or via a wired connection between the mobile computing device 1300 and a separate computing device associated with the mobile computing device 1300, for example, a server computer in a distributed computing network, such as the Internet. As should be appreciated, such data/information are accessible via the mobile computing device 1300 via the radio 1372 or via a distributed computing network. Similarly, according to an aspect, such data/information are readily transferred between computing devices for storage and use according to well-known data/information transfer and storage means, including electronic mail and collaborative data/information sharing systems.

FIG. 14 illustrates one example of the architecture of a system for improving perceptibility in ink effects as described above. Content developed, interacted with, or edited in association with the electronic authoring environment 180 is enabled to be stored in different communication channels or other storage types. For example, various documents may be stored using a directory service 1422, a web portal 1424, a mailbox service 1426, an instant messaging store 1428, or a social networking site 1430. The electronic authoring environment 180 is operative to use any of these types of systems or the like for providing ink effects with enhanced perceptibility, as described herein. According to an aspect, a server 1420 provides the electronic authoring environment 180 to clients 1405a-c (generally clients 1405). As one example, the server 1420 is a web server providing the electronic authoring environment 180 over the web. The server 1420 provides the electronic authoring environment 180 over the web to clients 1405 through a network 1440. By way of example, the client computing device is implemented and embodied in a personal computer 1405a, a tablet computing device 1405b or a mobile computing device 1405c (e.g., a smart phone), or other computing device. Any of these examples of the client computing device are operable to obtain content from the store 1416.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope of the present disclosure.

I claim:

1. A method for improving pattern perceptibility as applied to an ink object, comprising:
   selecting a contrast basis image and, based on the selected contrast basis image, defining a plurality of contrast values to be applied in an enhanced ink effect definition;
   selecting a color image and, based on the color image, defining color values to be applied in the enhanced ink effect definition;
   defining a contrast filter for each of the defined plurality of contrast values, wherein defining the contrast filter includes isolating a selected portion of the contrast values of the contrast basis image, wherein each of the plurality of contrast filters includes an isolated selected portion of the contrast values that is different from the isolated selected portion of contrast values of the other of the plurality of contrast filters, and wherein the isolated selected portion of contrast values for each of the plurality of contrast filters is selected to include only one of: high-tone contrast values, mid-tone contrast values or low-tone contrast values; and
   applying, serially, each of the contrast filters atop the color image and atop any contrast filters previously applied to produce the enhanced ink effect definition.

2. The method of claim 1, further comprising:
   determining whether the enhanced ink effect definition is perceptible for a given area of the enhanced ink effect definition; and
   in response to determining that the enhanced ink effect definition is not perceptible for the given area, applying at least one additional contrast filter to the enhanced ink effect definition.

3. The method of claim 2, wherein determining whether the enhanced ink effect definition is perceptible for the given area comprises:
   selecting multiple portions of the enhanced ink effect definition, wherein each portion of the multiple portions is equivalent in size to the given area;
   determining a contrast change in each portion of the multiple portions;
   comparing the contrast change to a perceptibility threshold;
   in response to the contrast change associated with each portion of the multiple portions satisfying the perceptibility threshold, determining that the enhanced ink effect definition is perceptible for the given area; and
   in response to the contrast change associated with at least one portion of the multiple portions not satisfying the perceptibility threshold, determining that the enhanced ink effect definition is not perceptible for the given area.

4. The method of claim 2, wherein the given area is defined by a geometry associated with a dry stroke of the ink object.

5. The method of claim 2, wherein the given area is defined by a pre-defined length and a user-selected width for a wet stroke of the ink object.

6. The method of claim 2, wherein the at least one additional contrast filter is defined based on a second contrast basis image, the second contrast basis image defining additional contrast values to be applied in the enhanced ink effect definition.

7. The method of claim 2, wherein the at least one additional contrast filter is defined based on a procedural filter, the procedural filter defining modifications to the contrast values of the contrast basis image.

8. The method of claim 1, further comprising rendering the contrast basis image tileable without visible seams between each tile of the contrast basis image.

9. The method of claim 8, wherein the contrast basis image is rendered tileable prior to defining multiple contrast filters based on the contrast basis image, wherein the multiple contrast filters are based on the tileable contrast basis image.

10. The method of claim 8, wherein the contrast basis image is rendered tileable along two axes.

11. The method of claim 1, wherein the color image comprises a tileable gradient sized according to a size of the contrast basis image.

12. The method of claim 1, wherein isolating the selected portion of the contrast values of the contrast basis image selects the contrast values according to a filter definition defining a luminance of the contrast values to be selected from the contrast basis image.

13. The method of claim 1, wherein the contrast basis image is a glitter texture image.

14. The method of claim 13, wherein each of the contrast filters comprises a sub-texture of the glitter texture image.

15. The method of claim 13, wherein the color values of the glitter texture image affect the chrominance of the color values of the color image.

16. The method of claim 13, wherein the color values of the glitter texture image do not affect the chrominance of the color values of the color image.

17. The method of claim 13, wherein the color image is a color spectrum image.

18. The method of claim 3, wherein a minimum size of the given area is predetermined.

* * * * *